Sept. 6, 1960            J. F. BYRNE            2,951,443
IMAGE REPRODUCTION
Filed Dec. 27, 1956            2 Sheets-Sheet 1
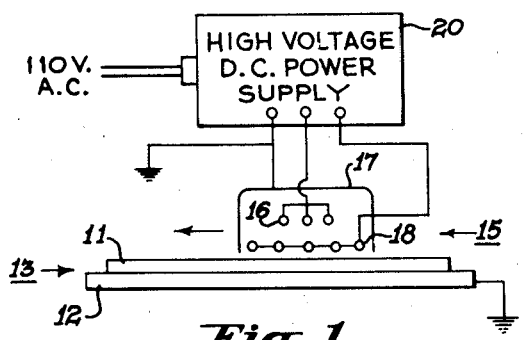
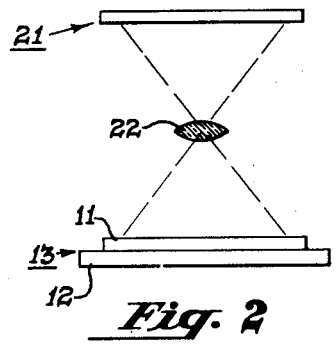
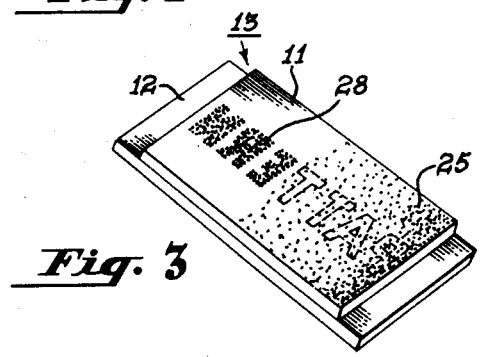
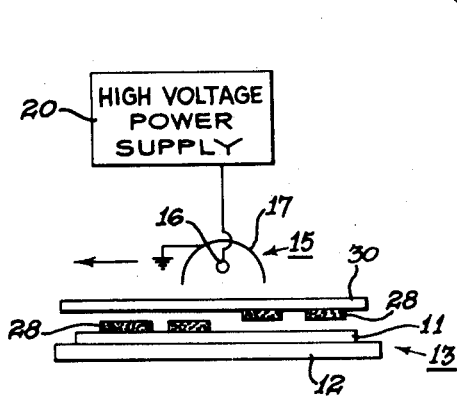
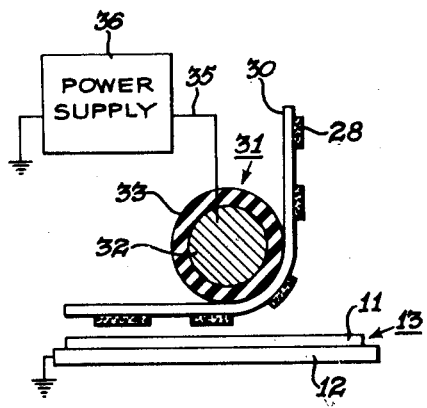
INVENTOR.
JOHN F. BYRNE
BY
ATTORNEY Sept. 6, 1960

J. F. BYRNE 2,951,443

IMAGE REPRODUCTION

Filed Dec. 27, 1956

INVENTOR.
JOHN F. BYRNE
BY
Frank A. Steinmiller
ATTORNEY

United States Patent Office 2,951,443
Patented Sept. 6, 1960

2,951,443

IMAGE REPRODUCTION

John Frank Byrne, Columbus, Ohio, assignor, by mesne assignments, to Haloid Xerox Inc., Rochester, N.Y., a corporation of New York Filed Dec. 27, 1956, Ser. No. 630,797

21 Claims. (Cl. 101—426)

This invention relates in general to electrostatic images and in particular to maintaining an electrostatic charge pattern during transfer of the developed image therefrom. This is a continuation-in-part of patent application Serial No. 618,116, now abandoned, filed October 24, 1956, entitled, "Image Reproduction."

Electrostatic charge patterns or images may be formed in many known ways. One techinque which has been employed in connection with this invention is through the use of xerography. As xerography is conventionally practiced today, an electrostatic latent image or an electrostatic charge pattern is formed on the surface of a sensitive photoconductive insulating layer through exposure of the layer to a pattern of activating radiation which selectively discharges areas of the surface. Thus, following exposure, an invisible charge pattern corresponding to the image pattern to which the plate was exposed results on the plate surface. This charge pattern may be visualized through the deposition of electrostatically charged powder particles which deposit on the plate surface in conformity with the image pattern due to the electric fields of force created between the particles and the charge pattern on the plate surface. This particle image comprises loose powder particles electrostatically held in position which may easily be removed from the surface by wiping or the like. To create a permanent visible image the particles may be fused on the plate surface. However, the plate member itself is a reusable member and, accordingly, it is preferred that the particles be removed from the surface to a transfer member to be permanently affixed thereon, thus freeing the plate for new xerographic cycles and additional images.

As has been indicated, the developer particles are electrostatically charged and, accordingly, electrostatic fields of force exist between the particles and the image bearing surface. When the particles are transferred to a transfer member they are separated from the charge bearing surface and, during separation, the lines of force which held the particles in place are accordingly stretched. When the conditions are ripe, as where the spacing has increased to a sufficient extent and with the increase in spacing an increase in the energy accumulated by ions of air in the gap, there results a release of charges from the charge bearing surface and deterioration of the original electrostatic charge pattern.

In xerography, because of a preference for electrostatic transfer techniques in transferring an image to a transfer member, a new problem arises while the difficulty described above relating to developer particles and charged areas tends to disappear. In accordance with the usual electrostatic transfer technique employed in xerography, a transfer member such as a sheet of paper is placed over the developed image and electrostatic charge is deposited on the transfer member. The deposited charge results in transfer of the particles from the image to the transfer member by providing an attractive field for the particles and at the same time a repelling field for the image charge. In the usual case, the transfer charge will be of the same sign as the image charge and, accordingly, in image areas the charge on the transfer material will act to maintain the charge pattern during transfer by creating a repelling field for the lines of force issuing from the charge pattern. However, in areas of background which may be considered areas of no charge or at least low charge on the image bearing surface a strong electrostatic field will exist to the transfer member due to the deposited transfer charge. Thus, during separation of the transfer member from the charge bearing surface the electrostatic field will cause charge deposition generally in an erratic fashion in areas of background through sparking and the like and the original charge pattern will thereby be distorted and contrast diminished.

Now, in accordance with the present invention, novel methods, means, and apparatus are disclosed whereby the original pattern is maintained in its original condition without distortion and developed visible images may be transferred therefrom and the pattern maintained for further utilization. Thus, in accordance with the present invention, the original pattern is preserved during transfer and, following transfer, additional visible images may be produced or the charge pattern itself may be utilized in connection with scanning devices, in a memory system, or the like.

For a better understanding of this invention, together with other and further objects thereof, reference is now had to the following description taken in conjunction with the following drawings in which:

Figure 1 illustrates sensitization of a xerographic plate;

Figure 2 illustrates exposure of a sensitive plate;

Figure 3 is an embodiment illustrating development of the plate carrying an electrostatic latent image;

Figure 4 illustrates electrostatic transfer of a developed image to a transfer member;

Figure 5 illustrates separation of the transfer member from the charge bearing surface; and, Figure 6 illustrates an embodiment of an automatic machine adapted to produce multiple copies in accordance with this invention.

Figure 6:
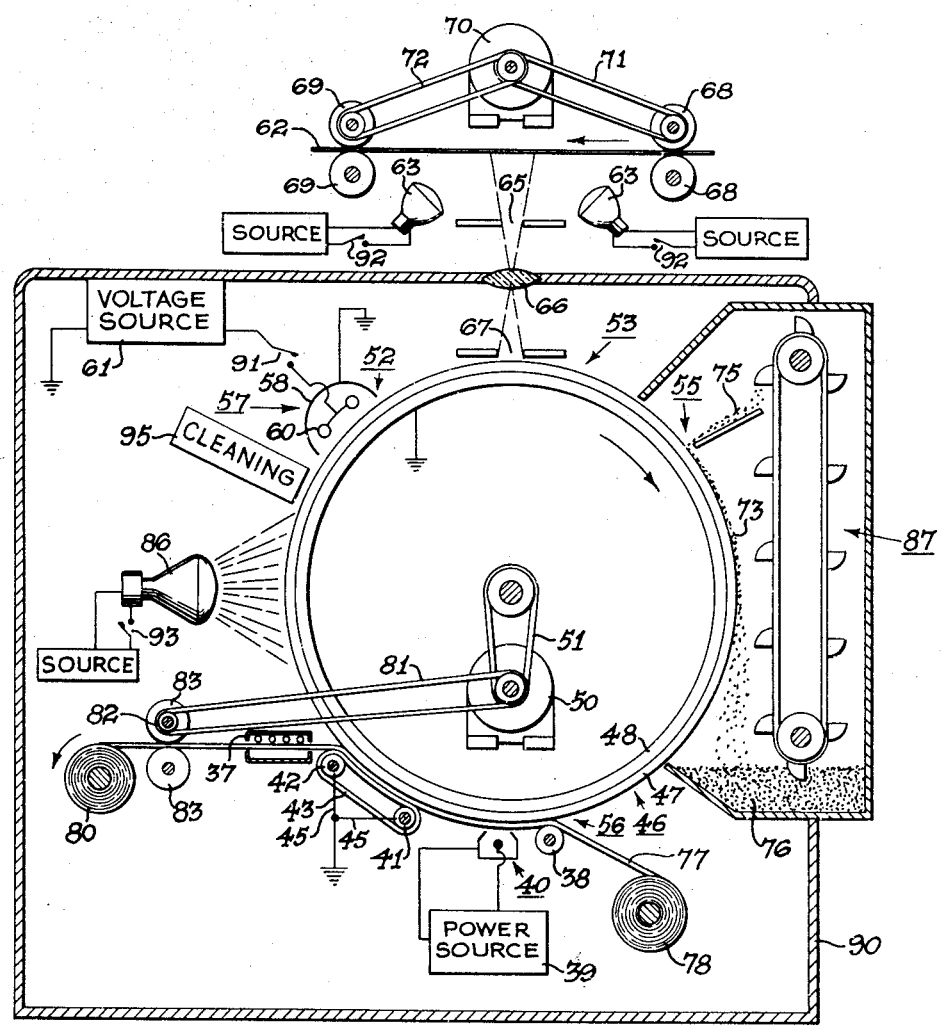

Reference is now had to Figure 1 wherein charging or sensitizing is illustrated. As shown in this figure, an ion source comprising a corona discharge device generally designated 15 is passed over the surface of plate 13 comprising photoconductive layer 11 on grounded support base 12. The corona discharge device may be, for example, of the type described in Lewis E. Walkup application Serial No. 154,295, filed April 6, 1950, for Charging Device, now U.S. Patent No. 2,777,957. This comprises a grid of fine wires 16 held at several thousand volts potential with respect to a grounded metal chamber 17 which provides a housing around the top and sides of the grid 16 whereby a corona discharge is produced around the wires. A control grid 18 of coarser wires is located between corona grid 16 and layer 11 on support plate 12, the second grid 18 being held at an intermediate potential of several hundred volts above ground potential. Grid 18 serves to control or limit the potential placed upon layer 11 and prevents overcharging. The potentials are supplied by high voltage power supply circuit 20 such as a transformer rectifier circuit and a voltage dividing resistance for supplying the required potentials to grids 18 and 16. Since charging makes the plate 13 sensitive to light, charging is carried out in darkness or in a light to which the plate is insensitive, for example red light, as is often the case. Desirably also, the support base which is conductive is grounded during charging. The photoconductive insulating layer 11 on the plate member may comprise any of a number of photoconductive insulators known in the art, as, for example, amorphous selenium, selenium-tellurium mixtures, photoconductive materials in insulating binders such as zinc oxide in a resin insulating binder, or the like.

After charging, photoconductive insulating layer 11 is sensitive to light or other activating radiation and is exposed, for example, as is illustrated in Figure 2. Although a particular charging grid and a particular technique of charging is illustrated in this figure, it is to be realized that other known techniques may be used and are intended to be included within the scope of this invention. These other devices and techniques include, but are in no way limited to, radioactive ion charging, induction charging, or the like as is well known in the art.

In Figure 2 there is shown copy to be reproduced generally designated 21, a lens designated 22, and a plate 13 in position for exposure. Material to be copied from copy 21 may be illuminated and is focused by lens 22 onto the surface of layer 11, the photoconductive insulating layer which overlies backing support 12 of plate 13. During exposure the electrostatic charge which has been applied to the surface of layer 11 in accordance, for example, with Figure 1 is dissipated in areas struck by light to leave a charge pattern remaining where light does not reach the surface of plate 13, as in black lines and letters of the image. The electrostatic charge pattern formed on layer 11 is the image which will subsequently be developed, maintained during transfer, redeveloped, if desired, and the like in accordance with this invention.

Although projection of an optical image is illustrated in this figure, it is to be realized that other techniques of image formation known to the art are intended to be included herein; for example, the charge pattern on the surface of layer 11 may be formed by exposing the charged plate to an X-ray shadow pattern or other radiation patterns, through contact exposure, or the like.

It is further to be realized that, although xerography is being employed to illustrate this invention, other techniques for forming electrostatic chrage patterns exist and are intended to be included within the scope of the present invention. Accordingly, it is contemplated that this invention may be carried out with electrostatic images formed in various ways. For example, the charge pattern may be formed through the selective deposition of electrostatic charge in image configuration on the surface of an insulating layer as, for example, through the use of spark discharge techniques, field emission techniques, or other charge migration techniques whereby an electrostatic charge pattern is deposited or formed on a surface which may subsequently be utilized through development to thereby make it visible. The electrostatic images produced by any of these various methods may be continuous tone patterns in which the charge varies gradually in density from point to point, or may be images with large, black, gray, and white areas as well as images of lines and characters.

In Figure 3 there is illustrated development of an electrostatic charge pattern or an electrostatic latent image formed in accordance with the xerographic techniques illustrated in Figures 1 and 2. By exposing the sensitive plate in accordance, for example, with the embodiment of Figure 2 there is created on the surface of the photoconductive insulating layer 11 overlying conductive backing member 12 of plate 13 an invisible electrostatic charge pattern, and in this figure this charge pattern is developed by the technique generally known in the art as "cascade development." In cascade development, which is described in Walkup U.S. Patent 2,618,551, a mixture of particles 25 is presented to the image bearing surface. The particles are generally frictionally electrostatically charged and the electrostatic fields of force which exist between the charges on the particles and the charges on the surface of the plate cause particle deposition in conformity with the electrostatic charge pattern on the image bearing surface resulting in image 28.

The developer generally used in cascade development comprises a dry mixture of fine particles electrostatically adhering to larger particles generally referred to as "carrier particles." The particles adhere to one another because of their triboelectric relationship and yet the carrier particle will part with the finer particle to the electrostatic charge pattern as the combination of carrier particles and fine particles passes over and in contact with the electric field of influence of the charge pattern. During development particles are passed across the plate surface either once or a number of times and the finer particles deposit making the invisible image charge pattern visible through the deposition of visible, fine particles.

Various known xerographic developers have been found to work well in this invention in forming image 28. The developer particles, to carry out this invention, however, are necessarily composed of insulating material. Insulating material is used to prevent the discharge of the electrostatic image on the surface being developed and to maintain its continued existence for additional cycles as will be described more fully hereinafter. Such developers are available under the trademark "XeroX" and are sold as "Developer" and "Toner" by The Haloid Company, of Rochester, New York. In addition, there are disclosed valuable developer materials of the type sold under the "XeroX" trademark in Walkup U.S. Patent 2,618,551, and Walkup and Wise U.S. Patent 2,638,416, and Landrigan U.S. Patent 2,753,308. Other developers and toners generally known in the art which are of insulating material are also intended to be included herein. Desirably, the developer material which is used results in low background particle deposition.

Although in connection with Figure 3 cascade development is illustrated, it is to be realized that other known xerographic development techniques may be used in carrying out this invention. Accordingly, it is intended to include within the scope of this invention other known xerographic developing techniques including, but not limited to, loop development, powder cloud development, brush development, magnetic development, and the like. Specifically, it is noted that where a rigid plate member is being used cascade development is presently preferred to produce line copy images and powder cloud development is generally preferred to produce continuous tone images. Where flexible plates are being used loop development or cascade development tend to produce the best results in terms of quality, but there exist situations where it may be desirable to employ brush development, magnetic development, or the like.

In Figure 4 there is illustrated the electrostatic transfer process as commonly employed in xerography. In order to carry out transfer a transfer member 30 is positioned above the developed image 28 on the surface of plate 13 which comprises a photoconductive insulating layer 11 overlying a conductive backing member 12, and the assembly is moved relative to the corona discharge electrode 15 supplied with a high potential from high voltage power supply 20 while shield 17 is connected to ground. The discharge electrode illustrated in this figure may be of the same type as shown in Figure 1 or it may comprise one or more discharge wires 17 partially surrounded by a shield and without a screen control electrode as was included in Figure 1. As is shown in this figure, following passage of the electrode over portions of the assembly the image 28 moves and is transferred to transfer member 30. It is to be realized, of course, that the spacings involved are, in the practical sense, minute and, thus, they have been distorted in this figure for illustrative purposes in order that the invention may be fully understood.

The transfer member 30 may comprise any one of a number of materials or layers. In a general sense, the transfer member is preferably substantially uniform in thickness, resilient, or at least flexible, and sufficiently resistive to prevent charges applied to the transfer member from rapidly draining away and to permit adjacent areas of the transfer member to be maintained at different potentials without appreciable current flow therebetween. Examples of transfer members commonly used in the art include various insulating films such as cellophane and other cellulosic derivatives, polyethylene, vinyl plastic films, polyester films, and the like. In addition, other layers such as rubber and other elastomers may be employed as well as fibrous layers such as papers, cloths, card stock, and the like. The presently preferred transfer material comprises paper, and best results are obtained when paper is used in a dry condition.

In Figure 5 separation of the transfer member 30 carrying image 28 from the surface of plate 13 comprising photoconductive insulating layer 11 overlying backing member 12 takes place as roller 31, preferably a freely rotating roller mounted as is well-known in the art, presses against the rear surface of transfer member 30. As illustrated in this figure, backing member 12 of plate 13 is held at ground potential. It is to be realized, of course, that ground is herein used only as a reference point and that in actuality the backing member may be at a raised potential as long as a reference point exists to create a potential difference when desired as will be discussed more fully hereinafter. Roller 31 comprises a conductive core 32 surrounded by covering layer 33. Conductive core 32 is connected through lead 35 to power supply 36 which may be any conventionally known D.C. supply, and during separation of transfer member 30 from plate 13 a potential is applied to the conductive portion 32 of roller 31.

It is to be realized that at this point transfer of the image to transfer member 30 has already taken place even though the surfaces are still together where, for example, electrostatic transfer of the type illustrated in Figure 4 is employed and roller 31 is being used during separation particularly for purposes of maintaining an invisible electrostatic charge pattern on the surface of photoconductive layer 11 without deterioration or distortion during the separation step. In a real sense, the roller is employed to maintain the electric stress between the surfaces below the breakdown point of the air to thus prevent unwanted discharge and image deterioration. The roller 31 may be moved relative to the transfer member 30 by rolling it over the back of the transfer member and peeling the transfer member along the circumference of roller 31 from the surface of photoconductive layer 11 as roller 31 passes over transfer member 30, or the assembly of plate 13, developed image 28, and transfer member 30 may be moved relative to a stationary roller, rod, or edge, and transfer member 30 may be peeled against the roller, rod, or edge away from the surface of photoconductive layer 11. Following movement of the entire assembly beneath the roller and peeling of the transfer member against roller 31 away from photoconductive insulating layer 11, transfer of image 28 to transfer member 30 is completed and the original image will remain intact on the surface of photoconductive insulating layer 11.

Covering layer 33 of roller 31 preferably comprises a resilient material. Such a layer allows a foreign body such as a carrier particle or the like which is between the roller and the transfer member to become imbedded in the covering layer while substantially all other areas of the roller along the line of contact are maintained in contact with the transfer member. If a rigid outer covering layer is used and a foreign body finds its way between the roller and the transfer member, damage to the photoconductive insulating layer or the plate member can be expected and, in addition, the original image on the plate will not be maintained in its original quality; instead, it can be expected that sparking and other image distorting phenomena may take place without control and in a non-uniform manner. Accordingly, it is preferred in carrying out separation according to this invention to employ as the covering layer 33 a sufficiently soft and resilient layer to allow a gentle pressure to be exerted against the transfer member while on the plate surface and to allow continuous contact with the transfer member during separation and also contact with substantially all areas of the transfer member even if foreign bodies are present between the transfer member and covering layer 33. Preferably also, the covering layer 33 is of substantially uniform thickness and has throughout substantially the same resistive characteristics.

It is to be realized that when separation of the transfer member from the plate surface takes place without the presence of a control roller such as roller 31 or the like the capacitance between the transfer member and the surface of the photoconductive insulating layer decreases as the gap between the two increases. As capacitance decreases, since the charge on each surface is not varied, the potential increases at a rapid rate during separation and usually a point is reached at which the potential becomes sufficiently great to bring about an electric air breakdown between the surfaces. This breakdown distorts the image pattern on the image bearing surface. Roller 31 therefore in this invention is placed in contact with the transfer member at the point of separation and a potential is applied to the conductive core 32 of roller 31 to maintain a constant voltage or potential difference as the transfer member is separated from the plate surface by maintaining the potential constant during separation through the use of an externally applied potential between the roller core and the plate backing member. Thus, sparking or other electric air breakdown phenomena are prevented and the image is maintained on the charge bearing surface in its original condition.

As air breakdown through sparking or the like can be expected between a transfer member and the image surface when separation is carried out without the use of an external field control member such as roller 31, so, too, air breakdown or the like is expected and takes place when the transfer member is separated from roller 31. As separation takes place, the capacitance between the transfer member and the roller is decreased and, accordingly, the potential difference between the two increases at a rapid rate until eventually sparking or other discharge mechanism comes into operation. However, sparking at this point will not disrupt the original charge pattern nor, it has been found, will sparking or other discharge mechanism in any way distort the developed image on the transfer member. However, in order to dissipate the charges released and deposited on the roller during separation of the transfer member from the roller, covering layer 33 of the roller preferably is sufficiently conductive so that its outer surface is continuously maintained as an equipotential surface. Experimentation has shown that materials having a resistivity as high as $10^{10}$ ohm-centimeters for a thin layer may be used. It has also been found that materials which are very conductive may also be employed. However, if a conductor having a low resistance is employed, it should be used in a system in which the roller is not biased but is instead held at a ground potential or at substantially a ground potential. For example, in experiments carried out with this invention a conductive foil has been positioned across the rear surface of the transfer member and separation has been accomplished while the foil was at a ground potential as through contact with the operator or through direct connection to the backing member. The optimum value of resisitivity desired is in the order of from $10^4$ ohm-centimeters to $10^8$ ohm-centimeters. However, it is noted that true insulators may be used as long as a step of neutralization is employed following charging of the covering layer when the transfer member is separated from the roller and prior to roller contact of that area of the roller with the transfer member again. Covering layers which generally have been used in the experimentation carried out in connection with this invention have been generally in the range of 1/8 inch to 1/2 inch in thickness and have been composed of black rubber, treated sponge rubbers, treated plastics, treated cloth, and the like.

The voltage difference applied between the conductive core of roller 31 and the backing member of the plate in order to accomplish transfer without distorting the image pattern of charge on the plate surface is between zero and 950 volts when the original image has a maximum charge potential of 600 volts. The preferred area of operation to produce dense copies without distorting image quality of the original charge pattern has been in the range of from 500 to 900 volts. When more than 950 volts was applied sparking through the paper took place and as lower voltages were applied only weak images transferred to the transfer member. It is believed that with lower voltages the original charge pattern exercised some control over the developer powder particles and attracted them back from the transfer member and redeposited them on the plate surface. Experiments have also shown that, when using the preferred voltage difference of from 500 to 900 volts on the stress control element, the step of transfer illustrated in connection with Figure 4 may be entirely omitted. It is presently believed that the field created between the roller and the particles in such event is sufficient to cause transfer of the particles to the transfer member as well as sufficient to repel the image charge away from the particles. The transfer member is then peeled against the roller or other stress control element, and the attractive field between the particles and the transfer member continue until the particles are out of range of the latent image. They thus remain on the transfer member following separation from the control roller, and the original image is in no way deteriorated. This modification which combines stress control during separation as well as image transfer through the use of the stress control member is intended to be encompassed herein as well as other similar modifications which will readily occur to those skilled in the art.

Although the field controlling member has been illustrated as a roller, other elements as, for example, an edge or the like may be used. Similarly, an equipotential surface or its equivalent may be placed against the transfer member as, for example, foil or a coating layer, A.C. corona or D.C. corona of both polarities, or the like. Other modifications which will occur to those skilled in the art are intended to be included herein.

It is also to be realized that, as has been pointed out previously, the plate member 13 carrying charge is sensitive to light and light will discharge charge on its surface. Accordingly, since in this invention it is desired to maintain the charge pattern on the surface of the photoconductive insulating layer 11 through the transfer step so that it may be subsequently utilized, the various flow steps illustrated through and including Figure 5 are carried out in darkness or in a light to which the photoconductive insulating layer is insensitive.

Reference is now had to Figure 6 wherein an automatic type of machine is illustrated to reproduce multiple copies from a single charge pattern. A xerographic plate 46 in the shape of a drum comprising photoconductive insulating layer 47 backed by conductive layer 48 is driven by motor 50 through belt 51 in the direction indicated. Positioned around the surface of the xerographic plate 46 is charging station 52, exposure station 53, developing station 55, and transfer station 56. At the charging or sensitizing station 52 there is positioned corona discharge electrode 57 comprising an outer shell 58, which in this embodiment is illustrated as grounded, partially surrounding corona discharge wires 60 connected to voltage source 61 which supplies a high voltage in the order of several thousand volts to bring about corona discharge from discharge wires 60. The backing member 48 of drum 46 is, as illustrated, grounded, and when voltage source 61 is energized to supply high voltage to discharge wires 60 an electrostatic field is created between the wires and through the photoconductive insulating layer 47 to the backing member 48 to cause the ions created by the discharge to deposit on the surface of photoconductive insulating layer 47 thereby sensitizing the plate member. Exposure is next carried out at the exposure station 53 when desired by illuminating copy 62 by lamp 63 and projecting the illuminated copy 62 through slit 65 and through lens 66 and to the surface of photoconductive insulating layer 47 through slit 67. The copy is, when desired, moved as illustrated between rolls 68 and 69. Rolls 68 and 69 are driven, as illustrated, by motor 70 through belts 71 and 72. Projection type of exposure as illustrated in this figure is commonly known as "slit projection," and it is to be realized that other means of exposing the plate may be used. Copy 62 is moved when desired by rolls 68 and 69 at a linear speed corresponding to the linear speed of drum 46.

Next in the path of movement of the drum is development station 55 whereat developer particles 73 cascade from supply 75 across the surface of the photoconductive insulator 47 to catch basin 76. A hopper mechanism 87 may be employed to transport the developer particles from catch basin 76 to supply 75 to assure a continuous supply of developer particles. Alternatively, in place of the mechanism illustrated in this figure a brush developing device in the nature of a rotating brush which rotates through a supply of developer particles and then against the surface of the plate for development purposes may be employed. Such a brush may, for example, be a true fibre type brush such as fur or the like or may be a simulated brush such as magnetically formed brushes of iron filings or other magnetic particles. The brush bristles, if a brush is being employed, as they relate to the developer should have a triboelectric relationship to cause the particles to adhere to the bristles as the brush rotates through the supply of particles, and yet, adhere in a releasable fashion so that the particles may be released from the brush bristles to the electrostatic charge pattern on the surface of plate 47. Alternatively, other developing devices generally known in the art as well as multiple developing devices as, for example, developing with electrostatically attracted particles and magnetically attracted particles may be used and will in the usual case be chosen because of the copy being produced or the image being developed.

The xerographic plate 46 next passes to transfer station 56 whereat web 77 supplied from supply spool 78 to takeup spool 80 is caused to move at a linear speed equal to the linear speed of the circumference of drum 46 by friction drive rollers 83 driven by belt 81 through gears 82. The web 77 is fed against the surface of drum 46 and held in position thereat by guide roll 38 and roll 42. Transfer of the developed image from the drum surface of the transfer web 77 takes place as the web moves beneath corona charging device 40 connected to power supply 39. The web then moves beneath endless belt 43 which is a flexible conducting web such as conducting rubber, conductive metal, or the like and which is positioned over rollers 41 and 42. Rollers 41 and 42 are in this embodiment connected through leads 45 to ground. There is thus accomplished as the web moves past belt 43 separation of web 77 carrying the developed image without image distortion of the charge pattern on the surface of the photoconductive insulating layer 47. The web then moves into fixing chamber 37 wherein the transferred image is permanently affixed to web 77 as through the use of heat, vapors, or the like.

As is illustrated, the xerographic portions of the device are enclosed in a light-tight cabinet 90 in order to protect the charge pattern on the plate surface as the drum continues to rotate.

In operation, the device of Figure 6 runs through the entire process described for its first cycle. Following a revolution of the drum 46, voltage source 61 is de-energized automatically or manually through switch 91, and lamps 63 are similarly cut off as through switches 92. Motor 70 in the usual case is de-energized also. This is to allow the projection of a section of copy and to prepare the copy material to produce the next section when desired. If single sheets of copy material 62 are being projected to the surface of plate 46, then, generally, the copy will have completely passed through the exposure area. In such an event no further need to drive rolls 68 and 69 exists. However, provisions may also be made, either manually or mechanically controlled to drive rolls 68 and 69 for a slight time interval after the copy has passed through the exposure station to thereby free the copy from rolls 69 when single sheets are being copied. Accordingly, the drum after the first cycle is completed rotates repetitively first through the development station 55 and next through transfer station 56 to produce copy and, when the desired number of copies is produced, a light 86 may be energized as through switch 93 to erase the electrostatic charge pattern on the surface of photoconductive insulating layer 47 and to prepare the photoconductive insulating layer for a new electrostatic latent image. Optionally, there may also be positioned between light 86 and charging station 52 a cleaning means 95, as, for example, is disclosed in Walkup et al., U.S. Patent 2,752,271, to be energized to move against the plate when erasure means 86 is to operate.

To form a new image, voltage source 61 is energized to sensitize the plate surface and the new exposure is carried out at exposure station 53 after which the charging station 52 and the exposure station 53 (as well as the cleaning and erasure means) play no part in the operation of the mechanism of this figure as copies are successively produced until the desired number of copies has been made as, for example, controlled by a counter or the like at which time the charge pattern on the surface of the plate member is again erased by exposure light 86 or other similar mechanism and a new image is formed. Both the charging station and the exposure station may be brought into operation with erasure means 86 or alternatively they may be controlled to be brought into operation when desired and erasure means 86 may be controlled by a counter or the like registering the number of copies or rotations made to automatically operate when a preset number of copies or rotations has been completed.

It is to be realized that a device of the type described in connection with this figure may be employed to reproduce copy of varying sizes as well as to reproduce copy in enlarged or reduced form. It is also to be realized that a device of this type is useful in producing single copies as well as a plurality of copies. And further, it is to be realized that a device of this type is useful in rapidly producing a great number of copies following exposure.

Although a particular device has been illustrated in Figure 6, it is to be realized that the various stations along the surface of the drum member 46 may be substantially modified and yet remain within the general scope and intent of this invention. Thus and for example, rather than slit exposure, contact exposure or other types of image formation on the xerographic drum surface may be used. Similarly, an insulating layer carrying a charge pattern or on which a charge pattern is placed may be substituted for the rigid drum of this figure and the member may be formed in the shape of an endless belt or the like. Also, it is to be realized that image formation may be carried out at some remote point and the surface carrying the image may then be placed in position for development and transfer for the number of cycles desired without operating the charging or exposure stations or, alternatively, the charging and exposure station may be removed from the device. Other similar modifications which will readily occur to one skilled in the art are also intended to be included herein.

It is also to be realized that, although in the embodiments of this invention described in connection with the drawing, electrostatic transfer of the image has been used, other techniques of transfer as well as other techniques of electrostatic transfer may be employed. Thus and for example, adhesive or pressure type transfer in which the developed image is imbedded in or on a pressure sensitive transfer member or magnetic transfer may be employed prior to the separation stage. It is also to be realized that the transfer mechanism may also act as the separation mechanism as, for example, when a roller of the type employed in Figure 5 is used with, for example, an adhesive transfer sheet, the roller may provide both the pressure necessary to imbed and transfer the image from the plate surface to the transfer member as well as maintain the voltage during separation so that sparking and other breakdown phenomena are prevented. Other similar modifications will readily occur to those skilled in the art and such combinations are intended to be included herein. It is also to be realized that, although throughout the transfer member has generally been referred to as flexible, a rigid transfer member may be employed where the image bearing surface is flexible and may be peeled from the transfer member. The invention in such a situation operates as described in that the fields are maintained during separation by placing the field controlling means behind the image bearing surface rather than the transfer member. It is to be realized also that other modifications and combinations will readily occur to those skilled in the art and such modifications and combinations are intended to be included herein.

This invention has been described as carried out in the specific embodiments thereof and it is not desired to be limited thereby, but it is intended to cover the invention broadly within the spirit and scope of the appended claims.

What is claimed is:

1. The method of maintaining in its original condition an electrostatic charge pattern on an insulating surface while separating therefrom a developed image comprising electrostatically charged developer particles electrostatically bound to the insulating surface, said method comprising separating the developed image from the insulating surface while applying between the image being separated and the image bearing surface a uniform and constant potential difference in the range between about 500 and about 900 volts to maintain the electrostatic fields of force between the developed image and the insulating surface below air breakdown during separation.

2. The method of maintaining an electrostatic charge pattern on an insulating surface while transferring therefrom a developed image comprising electrostatically charged developer particles electrostatically bound to the charge pattern, said method comprising positioning a surface of a web of transfer material in contact with the developed image and effecting image transfer to the web, and then through the application of an externally applied constant potential difference of less than about 950 volts, maintaining the electrostatic fields of force between the image being separated and the insulating charge pattern bearing surface below air breakdown during separation of the web from the insulating surface.

3. The method of maintaining an electrostatic charge pattern on an insulating surface while electrostatically transferring therefrom a developed image comprising positioning a surface of a web of transfer material in contact with the developed image and applying electrostatic charge to the opposite surface of the web to effect image transfer to the web, and then through the application of an externally applied constant potential difference of less than about 950 volts maintaining the electrostatic fields of force between the image being separated and the insulating charge pattern bearing surface below air breakdown during separation of the web from the insulating surface.

4. The method of maintaining an electrostatic charge pattern in its orignal condition on an insulating surface while electrostatically transferring therefrom a developed image comprising positioning a surface of a web of transfer material in contact with the developed image and applying an electrostatic charge to the opposite surface of the web to effect image transfer to the web, and then through the application of an externally applied constant potential difference in the range between about 500 and about 900 volts maintaining the electrostatic fields of force between the image being separated and the insulating charge pattern bearing surface below air breakdown during separation of the web from the insulating surface, separation being accomplished by peeling the web away from the insulating surface.

5. The method of producing a plurality of prints from a single electrostatic latent image pattern on the surface of a reusable insulating layer on which varying patterns may be formed comprising developing the electrostatic latent image with fine insulating particles, placing over the developed image a transfer member, electrostatically transferring the developed image to the transfer member and separating the transfer member from the surface of the reusable insulating layer while maintaining a constant electrostatic potential difference in the range between about 500 and about 900 volts at a level below air breakdown between the transfer member and the surface of the reusable insulating layer, and then through at least one additional cycle redeveloping the original electrostatic latent image with fine insulating particles, and transferring the new developed image to a transfer member and separating the transfer member from the surface of the reusable insulating layer.

6. The method of claim 5 in which the insulating layer comprises a photoconductive insulator and in which the manipulations are carried out in the absence of light.

7. In a method of producing a plurality of prints from a single electrostatic latent image on an image retaining surface comprising repeating a print-making cycle for each print desired, a cycle comprising developing the electrostatic latent image with insulating particles, placing over the developed image a transfer member, electrostatically transferring the developed image to the transfer member, and separating the transfer member from the surface carrying the electrostatic latent image, the improvement comprising maintaining a uniform and constant potential difference of less than about 950 volts and at a level below air breakdown between the transfer member and the surface carrying the electrostatic latent image at the area of separation of the transfer member from the surface carrying the electrostatic latent image.

8. A device to produce a plurality of reproductions from a single electrostatic latent image pattern of a first polarity on an insulating layer comprising a uniform layer of photoconductive insulating material adapted to carry selectively deposited electrostatic charge defining an image pattern, a light-tight hood surrounding said photoconductive insulating layer and maintaining said layer in darkness, means to move said photoconductive insulating layer repetitively first through a development station and next through a transfer station, means at said development station to develop the electrostatic latent image on the surface of the photoconductive insulating layer with fine insulating particles electrostatically charged to a second polarity opposite to said first polarity and means at said transfer station to transfer the developed image to a transfer member and to separate the transfer member from the photoconductive insulating layer, the improvement comprising an electrode positioned and disposed adjacent to said photoconductive insulating layer at the area of separation at said transfer station within said light-tight hood against which the transfer member is separated from the photoconductive insulating layer to apply an external electrostatic potential difference of less than about 950 volts below air breakdown level between said electrode and said photoconductive insulating layer with said potential difference applied to apply said first polarity to said transfer member in respect to said photoconductive insulating layer to thereby transfer the loose powder particle developed image from the photoconductive insulating layer to the transfer member while maintaining the image quality of the electrostatic latent image on the photoconductive insulating layer.

9. A device as described in claim 8 in which the electrode comprises a roller.

10. A device as described in claim 9 in which the roller electrode comprises an inner electrically conductive core surrounded by a substantially uniform covering layer of electrically resistant material.

11. A device as described in claim 10 in which the covering layer has a resistance in the range of $10^4$ to $10^8$ ohm-centimeters.

12. The device as described in claim 11 and in which a power supply is electrically connected to create a potential difference in the range from about 500 to about 900 volts between the conductive core of the roller and the insulating layer.

13. Xerographic apparatus comprising a xerographic plate comprising a uniform layer of photoconductive insulating material overlying a conductive backing member, an image forming station comprising means to form an electrostatic charge pattern in image configuration and of a first electrical polarity on said xerographic plate, a development station comprising means to develop a formed charge pattern on said xerographic plate with fine developer particles charged to a second polarity opposite to said first polarity, a transfer station comprising means to transfer a developed image from said plate to a transfer member and to separate the transfer member carrying a transferred image from said plate against field control means positioned to contact said transfer member as said transfer member is separated from said plate, a potential source connected to said field control means and said conductive backing member of said plate to apply a constant and uniform potential in the potential range of less than about 950 volts between said conductive backing member and said field control means and in a direction to apply said first polarity to said field control means in respect to said conductive backing member, erasure means comprising means to erase through exposure of said plate a formed image from said plate, means to move said plate repetitively and in sequence through said image forming station then through said development station then through said transfer station then past said erasure means, and means to activate said image forming station following activation of said erasure means to form a new charge pattern on the plate surface, said erasure means being activated following production of a desired plurality of copies through repetitively cycling a plate carrying a formed image through said development station and through said transfer station the number of times equivalent to the number of copies desired.

14. The method of maintaining in its original condition an electrostatic charge pattern on an insulating surface while separating therefrom a developed image comprising electrostatically charged developer particles electrostatically bound to the insulating surface, said method comprising separating the developed image from the insulating surface while applying between the image being separated and the image bearing surface a uniform and constant potential difference of less than about 950 volts to maintain the electrostatic fields of force between the developed image and the insulating surface below air breakdown during separation.

15. The method of maintaining an electrostatic charge pattern on an insulating surface while transferring therefrom a developed image comprising electrostatically charged developer particles electrostatically bound to the surface, said method comprising positioning a surface of a web of transfer material across the developed image, and effecting image transfer to the web and separating the web bearing the developed image from the insulating surface while applying between the image being separated and the image bearing surface a uniform and constant external potential difference of less than about 950 volts to maintain electrostatic fields of force at the area of separation below air breakdown during separation of the web from the insulating surface.

16. The method of claim 15 in which transfer and separation are accomplished through the application of a control voltage to effect both transfer and separation in a single manipulation.

17. The method of claim 15 in which an electrostatic field is first applied to accomplish transfer of the developed image to the transfer web and then a second field is applied during separation to maintain the field at separation below air breakdown.

18. A device to produce a plurality of reproductions from a single electrostatic image pattern on an image bearing member capable of having formed thereon varying electrostatic image patterns comprising a support for an image bearing member, means to move an image bearing member on said support repetitively first through a development station and next through a transfer station, means at said development station to develop the electrostatic latent image on the surface of the image bearing member with electroscopic marking materials electrostatically charged to a first polarity, and means at said transfer station to transfer a developed image to a transfer member and to separate the transfer member from the image bearing member while maintaining a constant electrostatic potential difference of less than about 950 volts between said transfer member and the image bearing member with said potential difference being applied to create a potential of a second polarity at said transfer member to transfer the developed image from the image bearing member to the transfer member while maintaining image quality of the electrostatic latent image on the image bearing member.

19. A device according to claim 18 in which the means at said transfer station to transfer the developed image to a transfer member and to separate the transfer member from the image bearing member while maintaining a constant electrostatic potential difference comprises a first electrode to apply charge to the transfer member to effect transfer of the developed image to the transfer member and a second electrode to apply a constant potential during separation of the transfer member from said image bearing member.

20. A device according to claim 18 in which said means at said transfer station to transfer the developed image to a transfer member and to separate the transfer member from the image bearing member while maintaining a constant electrostatic potential difference between said transfer member and said image bearing member comprises a single electrode to effect transfer and maintain a constant electrostatic potential difference during separation.

21. Apparatus to produce a plurality of duplicate copies from an original comprising a photoconductive insulating layer and imaging means to form on said layer an electrostatic image corresponding to the original to be reproduced, a development station to deposit visible marking material in conformity with said electrostatic image, a transfer and separation station to transfer said marking material to a record member and to separate said marking material with said record member from said photoconductive layer, said transfer and separation station including means to maintain a constant electrostatic potential difference of less than about 950 volts between said record member and said photoconductive layer as said record member is separated from said photoconductive layer to maintain image quality of the electrostatic image while separating the marking material from said photoconductive layer, and means to cycle said photoconductive layer bearing an electrostatic image formed by said imaging means through a restricted cycle omitting said imaging means and including said development station and said transfer and separation station repetitively the number of cycles equaling the number of copies of the original desired.

References Cited in the file of this patent
UNITED STATES PATENTS

| | | |
|---|---|---|
| 2,307,698 | Melton et al. | Jan. 5, 1943 |
| 2,703,280 | Butterfield et al. | Mar. 1, 1955 |
| 2,726,166 | Greaves | Dec. 6, 1955 |
| 2,756,676 | Steinhilper | July 31, 1956 |
| 2,803,177 | Lowrie | Aug. 20, 1957 |
| 2,807,233 | Fitch | Sept. 24, 1957 |
| 2,812,709 | Gundlach | Nov. 12, 1957 |
| 2,816,493 | Lewis et al. | Dec. 17, 1957 |

UNITED STATES PATENT OFFICE
CERTIFICATE OF CORRECTION

Patent No. 2,951,443                  September 6, 1960

John Frank Byrne

It is hereby certified that error appears in the above numbered patent requiring correction and that the said Letters Patent should read as corrected below.

Column 1, line 22, for "techinque" read -- technique --; column 8, line 22, for "emloyed" read -- employed --; column 11, lines 74 and 75, strike out "below air breakdown level".

Signed and sealed this 5th day of September 1961.

(SEAL)
Attest:

ERNEST W. SWIDER
Attesting Officer

DAVID L. LADD
Commissioner of Patents

USCOMM-DC